(12) United States Patent
Cho (10) Patent No.: US 10,330,240 B1
(45) Date of Patent: Jun. 25, 2019

(54) MOUNTING ASSEMBLY

(71) Applicant: Cisco Technology, Inc., San Jose, CA (US)

(72) Inventor: Matthew M. U. Cho, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/852,770

(22) Filed: Dec. 22, 2017

(51) Int. Cl.
| | |
|---|---|
| *F16M 11/04* | (2006.01) |
| *H04Q 1/06* | (2006.01) |
| *F16M 11/16* | (2006.01) |
| *H04Q 1/02* | (2006.01) |

(52) U.S. Cl.
CPC .......... *F16M 11/041* (2013.01); *F16M 11/16* (2013.01); *H04Q 1/028* (2013.01); *H04Q 1/06* (2013.01); *F16M 2200/02* (2013.01)

(58) Field of Classification Search
CPC .. F16M 11/041; F16M 11/16; F16M 2200/02; H04Q 1/028; H04Q 1/06
USPC ........ 248/686, 27.3, 220.21, 220.22, 221.11, 248/222.12, 224.51, 224.61, 225.21, 248/225.11, 224.8
See application file for complete search history.

(56) References Cited

U.S. PATENT DOCUMENTS

| | | | | | |
|---|---|---|---|---|---|
| 3,758,198 | A | * | 9/1973 | Kanie | G03B 17/12 359/828 |
| 5,626,435 | A | * | 5/1997 | Wohlhuter | B60D 1/52 280/416.1 |
| 6,371,424 | B1 | * | 4/2002 | Shaw | F16M 11/041 248/187.1 |
| 8,020,821 | B2 | * | 9/2011 | Chen | F16M 13/02 248/220.22 |
| 8,770,868 | B1 | * | 7/2014 | Hasuda | G03B 17/14 396/531 |
| 9,404,615 | B1 | * | 8/2016 | Gonzalez | F16M 11/04 |
| 2008/0105803 | A1 | * | 5/2008 | Tu | H05K 5/0204 248/220.22 |
| 2009/0193632 | A1 | * | 8/2009 | Yeh | B62J 9/006 24/581.1 |
| 2012/0273630 | A1 | * | 11/2012 | Gillespie-Brown | F16M 11/041 248/122.1 |

(Continued)

OTHER PUBLICATIONS

International Search Report and Written Opinion from the International Searching Authority, dated Mar. 29, 2019, 10 pages, for corresponding International Patent Application No. PCT/US18/66554.

*Primary Examiner* — Muhammad Ijaz
(74) *Attorney, Agent, or Firm* — Polsinelli PC (57) ABSTRACT

A mounting apparatus including a base with a perimeter edge having at least one depression formed therein. A mounting plate can be detachably coupled with the base and have a corresponding perimeter edge with at least one displaceable protrusion formed thereon. The displaceable protrusion can have a biasing element configured to bias the displaceable protrusion away from the corresponding perimeter. At least a portion of the base perimeter edge is configured to compress the biasing element during rotation of the mounting plate relative to the base, thereby displacing the displaceable protrusion and wherein the displaceable protrusion is configured to engage the at least one depression.

18 Claims, 7 Drawing Sheets

(56) References Cited

U.S. PATENT DOCUMENTS

2014/0265765 A1* 9/2014 Khodapanah .......... F16M 13/02
312/223.1
2016/0316862 A1* 11/2016 Ho .......................... F16B 21/04
2017/0237216 A1* 8/2017 Janovec ................. H01R 31/08
439/507

* cited by examiner

MOUNTING ASSEMBLY

TECHNICAL FIELD

The present invention relates to mounting assembly, and more specifically to rotationally engaged mounting apparatus for equipment.

BACKGROUND

Equipment, including networking equipment, is often mounted at varying heights above ground throughout an environment to provide better service and protect the equipment from damage including vandalism. The mounting height of the equipment within an environment creates challenges for the installation and removal of the equipment from the height by a user. The user is often required to utilize a ladder or other height assistance device which can complicate the use of tools or other assembly items during installation and removal.

DESCRIPTION OF EXAMPLE EMBODIMENTS

Overview:

A mounting assembly for detachably securing equipment. A mounting assembly including a base with a perimeter edge having at least one depression formed therein. A mounting plate detachably couplable with the base. The mounting plate has a correspondingly shaped perimeter edge with at least one displaceable protrusion formed thereon. The displaceable protrusion having a biasing element biasing the displaceable protrusion away from the correspondingly shaped perimeter edge of the mounting plate. At least a portion of the base perimeter edge is configured to compress the biasing element, thereby displacing the displaceable protrusion prior to the displaceable protrusion engagement the at least one depression.

Example Embodiments:

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Several definitions that apply throughout this disclosure will now be presented. The terms "comprising," "including" and "having" are used interchangeably in this disclosure. The terms "comprising," "including" and "having" mean to include, but are not necessarily limited to, the things so described.

The term "coupled with" is defined as connected, either directly or indirectly through intervening components, and the connections are not necessarily limited to physical connections, but are connections that accommodate the transfer of data between the so-described components. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

Figure 1:
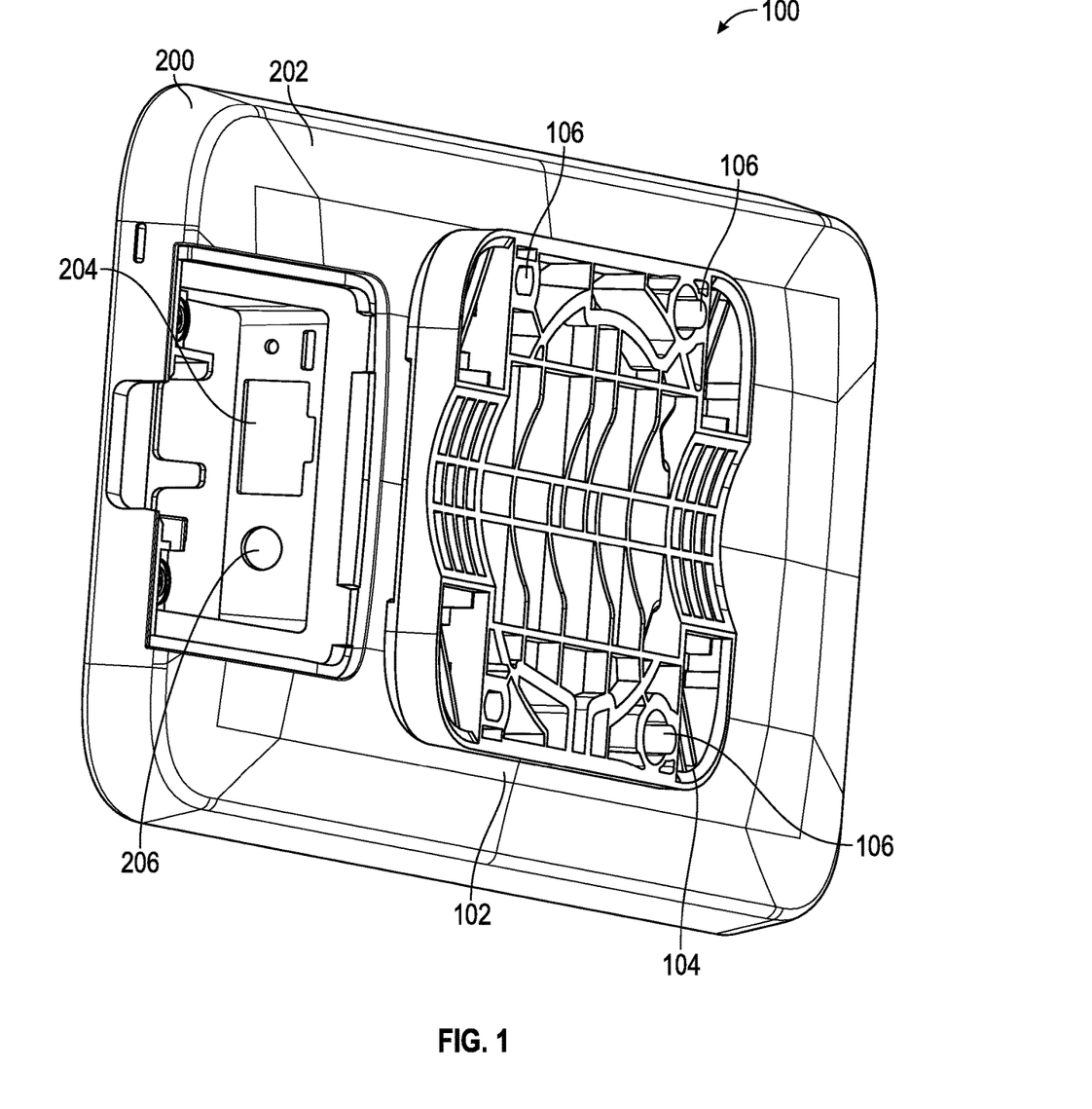
FIG. 1 illustrates a rear isometric view of an example embodiment of a mounting assembly.

FIG. 1 details a mounting assembly according to the present disclosure. The mounting assembly 100 can have a mounting plate 102 and a base 104. The mounting plate 102 can be integrally formed into and/or coupled with an equipment element 200. The equipment element 200 can be any device, including, but not limited to a wireless (i.e. WiFi) Access Point (AP), cellular communication antenna, networking device, antenna, or power supply.

Wireless APs are often positioned above ground level in places hard to reach by passing consumers for convenience, aesthetics, and security reasons. Installation of wireless access points, or other equipment elements 200, at such locations can often require the use of ladders or other elevated equipment. The mounting assembly 100 can be operated and rotationally engaged by an installation user with one-hand, thus allowing a free hand for support or stabilization with the ladder or other elevated equipment.

The base 104 can be configured to be secured to an object through one or more apertures 106 formed therein. The one or more apertures 106 formed in the base 104 can be through apertures allowing a fastener to be inserted therethrough for coupling with the object. In other embodiments, the one or more apertures 106 can extend only partially into the base 104 allowing a fastener to be inserted therein. In yet other embodiments, the one or more apertures 106 can be partially threaded for engagement with a threaded fastener. The fasteners can be threaded fasteners, push pin elements, or any other known fasteners.

The mounting assembly 100 can be secured by rotational engagement between the mounting plate 102 and the base 104. The mounting plate 102 can be aligned with the base plate 104 and rotated until securement is achieved. Depending on the particular orientation and/or arrangement of the base 104, securing of the mounting plate 102 can be achieved by rotation in either the clockwise or counter-clockwise direction. As explained in more detail below, one or more securement features, such as displaceable protrusions and/or tongues, can be implemented between the mounting plate 102 and the base 104 to insure proper securement of the mounting assembly 100.

The mounting assembly 100 can be rotated between a secured position and an unsecured position. In a secured position, the mounting plate 102 and the base 104 can be rotationally coupled and securely engaged one to the other forming a secure mounting assembly. In an unsecured position, the mounting plate 102 and the base 104 can be decouplable one to the other, such that the mounting plate 102 can be removable from and/or insertable into the base 104.

As can be appreciated in FIG. 1, the equipment element 200 has as mounting plate 102 integrally formed on a rear surface 202 for coupling with the base 104. The equipment element 200 further includes apertures 204, 206 on the rear surface 202 which can be configured for coupling interior components of the equipment element 200 to exterior components. With specific reference to FIG. 1, the equipment element 200 can be a WiFi AP having apertures in the rear surface 200 for a network port 204 and a power connector 206. While FIG. 1 illustrates the rear surface 202 of a WiFi AP equipment element 200, the mounting assembly 100 can be implemented with any equipment element 200 and the mounting plate 102 can be coupled with or integrally formed with the rear surface 202 of the equipment element 200 and the rear surface can omit apertures 204, 206 or have any number of apertures 204, 206.

The mounting assembly 100 can be implemented rotational engagement between the mounting plate 102 and the base 104. The rotational engagement can be performed by a user using a single hand, thus allowing the remaining hand for stability, security, and/or bracing. The equipment 200 implemented with the mounting assembly 100 is often placed at predetermined heights above ground level for security and/or to prevent theft, thereby necessitating the user use a ladder for coupling and decoupling of the mounting assembly 100. The base 104 can be secured to the desired object following by rotation engagement of the mounting plate 102 having the equipment element 200 disposed thereon. As discussed in more detail below, one or more security features can be implemented with the mounting assembly 100 to provide a user alignment and tactile feedback during the initial transition from the unsecured position to the second position while also preventing unwanted transition from the secured position to the unsecured position after initial installation.

Figure 2:
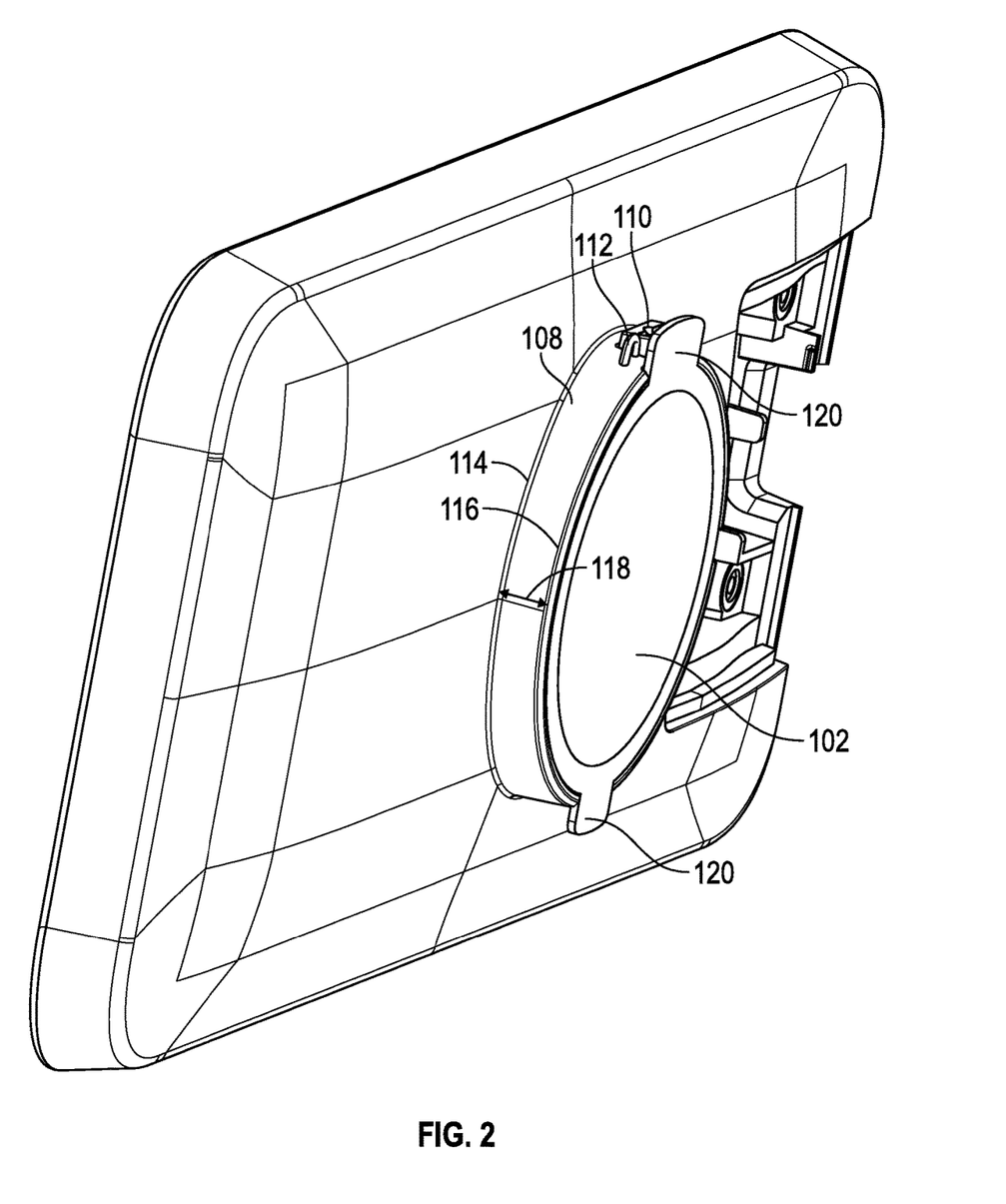
FIG. 2 illustrates a rear isometric view of an example embodiment of a mounting plate of a mounting assembly.

FIG. 2 details a mounting plate of a mounting assembly according to the present disclosure. The mounting plate 102 can be rotationally and detachably couplable with the base 104 (shown more clearly in FIG. 3). The mounting plate 102 can have a perimeter edge 108 with one or more security features formed thereon. The security features can assist in coupling the mounting plate 102 with the base 104 and further prevent unwanted transition from the secured position to the unsecured position. The security features can include at least one displaceable protrusion 110 and/or one or more tongues 120. In at least one embodiment, the security features can retain the mounting assembly in the secured position in view of unauthorized user forces, environmental forces, or any combination thereof. Environmental forces can include animal interactions, wind, rain, or other weather related forces.

The displaceable protrusion 110 can, in an undisplaced position, extend vertically away from the perimeter edge 108 and be displaceable such that when in a displaced position the displaceable protrusion 110 is substantially flush with the perimeter edge 108. The displaceable protrusion 110 can include a biasing element 112 configured to bias the displaceable protrusion 110 to the undisplaced position, and return the displaceable protrusion 110 to the undisplaced position after displacement. In at least one embodiment, the biasing element 112 is a spring. In other embodiments, the biasing element 112 can be an actuator, magnetic, or any other known biasing element.

The mounting plate 102 can have a proximal end 114 adjacent to the coupling between the mounting plate 102 and the equipment element 200 or, in instances in which the mounting plate 102 is integrally formed with equipment element 200, the proximal end 114 can be adjacent to the rear surface 202 of the equipment element. The mounting plate 102 can also have a distal end 116 opposite the proximal end 114. The distal end 116 can be separated from the proximal end 114 by a height 118 of the perimeter edge 108. The height 118 of the perimeter edge 108 can be the substantially equal to distance by which the mounting plate 102 extends away from the rear surface 202 of the equipment element 200.

The mounting plate 102 can further include one or more tongues 120 extending away from the perimeter edge 108 at the distal end 118 of the mounting plate 102. The one or more tongues 120 can be configured to engage with one or more grooves (shown in FIG. 3) for coupling the mounting plate 102 with the base 104. The one or more tongues 120 can extend away from the perimeter edge 108 substantially the same distance as the one or more displaceable protrusions 110. In other embodiments, the one or more tongues 120 can extend away from the perimeter edge 108 more or less than the one or more displaceable protrusions 110.

The one or more tongues 120 can extend away from the perimeter edge 108 sufficient to engage with the one or more grooves (shown in FIG. 3) sufficient to support the specific equipment element 200 implemented in view of expected environmental forces and anticipated unauthorized user forces. The one or more tongues 120 can away from the perimeter edge 108 further, and thus provide more security, for example implementation of the mounting assembly 100 in environments with high expected environmental forces (i.e. wind, rain, etc.) and/or high expected unauthorized user forces (i.e. theft, vandalism, etc.). In at least one embodiment, at least fifty (50) percent of the one or more tongues 120 is received within the one or more grooves 128.

The one or more displaceable protrusions 110 and the one or more tongues 120 can be rotationally engaged with one or more elements on the base 104 to secure the mounting assembly 100 in the secured position. The mounting assembly can include one or more displaceable protrusions 110 and/or one or more tongues 120 in any arrangement to assist in coupling the mounting plate 102 to base 104, including positioning the one or more protrusions 110 and the one or more tongues 120 along the perimeter edge 108 so as to allow coupling with the base 104 in only one orientation.

While FIG. 2 illustrates a mounting plate 102 with one displaceable protrusion 110 and two tongues 120, it is within the scope of this disclosure to include any number of displaceable protrusions 110 and/or tongues 120.

Figure 3:
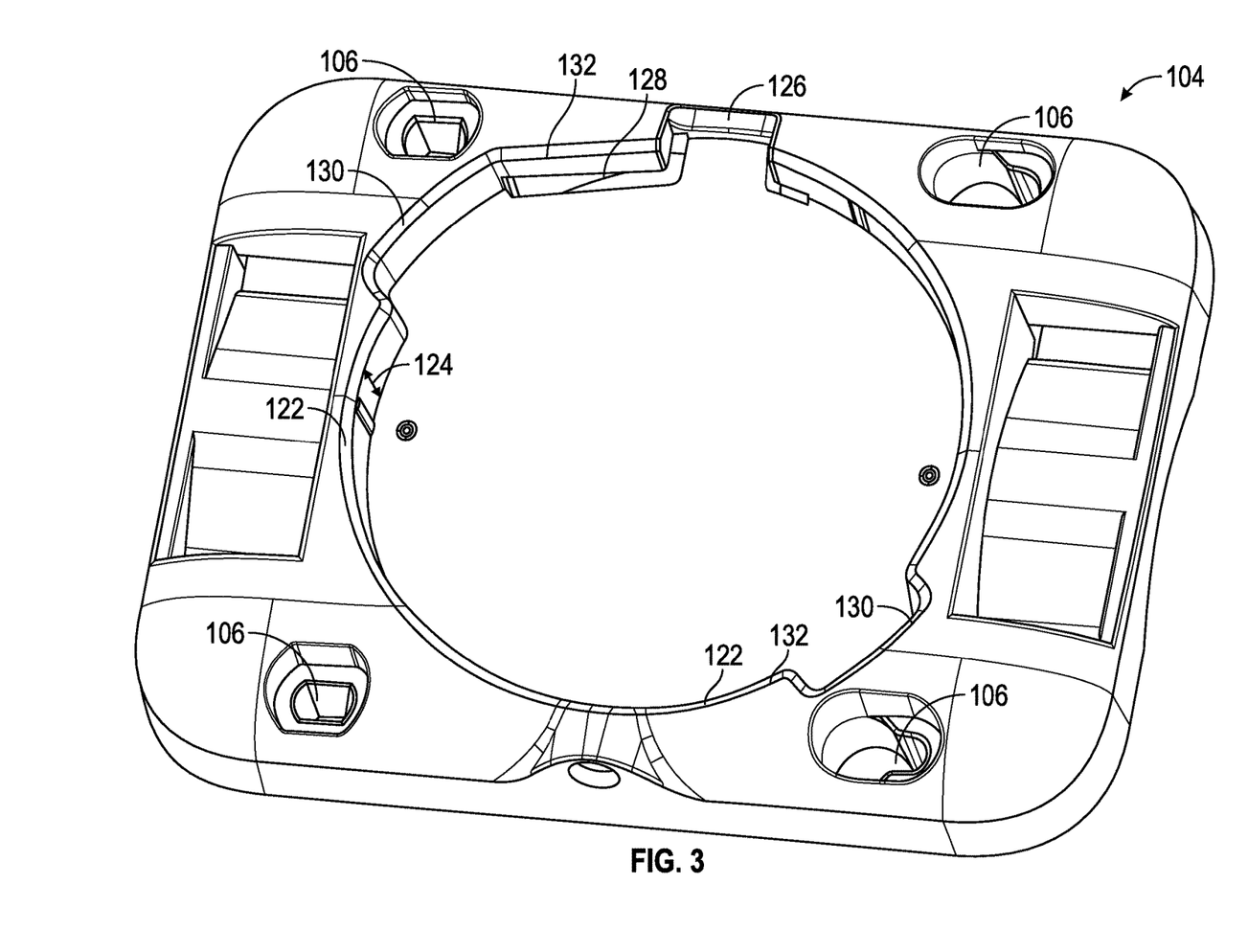
FIG. 3 illustrates an isometric view of an example embodiment of a base of a mounting assembly.

FIG. 3 details a base of a mounting assembly according to the present disclosure. The base 104 can be configured to receive the mounting plate 102 therein thereby the mounting plate 102 and the base 104. The base 104 can have a perimeter edge 122 having a depth 124 corresponding to at least the height 118 of the perimeter edge 108 of the mounting plate 102. The perimeter edge 108 of the mounting plate 102 can be correspondingly shaped to the perimeter edge 122 of the base 104.

The perimeter edge 122 of the base 104 can have at least one depression 126 formed therein. The at least one depression 126 can be correspondingly shaped and configured to receive the at least one displaceable protrusion 110 formed on the mounting plate 102. The at least one displaceable protrusion 110 received in the at least one depression 126 can secure the mounting plate 102 within the base 104 against rotation forces. The at least one depression 126 can also provide audible and tactile feedback during rotational engagement with the mounting plate as the at least one displaceable protrusion 110 is received therein. The rotational engagement between mounting plate 102 and the base 104 can provide audible feedback by the biasing element producing a "clicking" sound as the at least one displaceable protrusion 110 expands into the at least one depression 126, while tactile feedback can be similarly provided by displaceable protrusion 110 being received in the at least one depression 126 thereby stopping/preventing rotational movement applied by the user.

The base 104 can also include at least one groove 128 configured to receive and engage the one or more tongues 120 formed on the mounting plate 102. The at least one groove can engage with and secure the one or more tongues 120, thereby securing the mounting plate 102 and the base 104 together.

The base 104 can further include at least one groove entrance 130 configured to allow the one or more tongues 120 to enter the perimeter edge 122 of the base 104 and align with the at least one groove 128. The at least one groove entrance 130 can be formed in the perimeter edge 122 and receive the one or more tongues 120 during coupling between the mounting plate 102 and the base 104.

The at least one groove 128 formed in the base 104 can be configured to accommodate the one or more tongues 120 of the mounting plate 102. The at least one groove 128 can have sufficient depth to receive corresponding one or more tongues 120 extending away from the perimeter edge 108 of the mounting plate 102. In implementations where the one or more tongues 120 protrude further away from the perimeter edge 108, the at least one groove 128 can similarly extend away from the perimeter edge 122 further to accommodate the one or more tongues 120. The at least one groove entrance 130 can similarly be sized to accommodate and receive the one or more tongues 120 and their extension away from the mounting plate 102.

The at least one groove entrance 130 can expose a portion of the perimeter edge 122 to receive the one or more tongues, but can then allow the one or more tongues to enter the at least one groove 128 formed within the perimeter edge 122. The at least one groove 128 within the perimeter edge 122 can thereby secure the one or more tongues 120 and the mounting plate 102 from non-rotational (i.e. lateral) forces.

The perimeter edge 122 can include at least one ridge portion 132 configured to engage the displaceable protrusion 110 during rotation of the mounting plate 102 relative to the base 104 and transition the displaceable protrusion 110 from the undisplaced position to the displaced position. After sufficient rotation of the mounting plate 102 relative to the base 104 so as to align the displaceable protrusion 110 with the at least one depression 126, the biasing element 112 returns the displaceable protrusion 110 from the displaced position to the undisplaced position. The at least one ridge portion 132 can be a portion of the perimeter edge 122 configured to compress the biasing element 112. In at least one embodiment, the one or more ridge portion 132 can be a sloped or angled portion of the perimeter edge 122 of the base 104. The one or more ridge portions 132 can be adjacent to the at least one depression 126, thus compressing the biasing element 112 and the at least one displaceable protrusions 110 prior to expansion of the at least one protrusion 110 into the at least one depression 126 and providing a tactile and/or audible feedback to a user that rotational engagement is secure.

As discussed above with respect to FIG. 1, the base 104 can include one or more apertures 106 formed therein for coupling the base 104 to an object. The apertures 106 can allow fasteners to secure the base 104 in a fixed position to the object in preparation for coupling with the mounting plate 102. The base 104 can be coupled with building walls, fences, poles, ships, ceilings, radio towers, cellular towers, trees, or any other object. The one or more apertures 106 can be configured to receive fasteners, such as cable ties, threaded fasteners, and/or push connectors.

Figure 4:
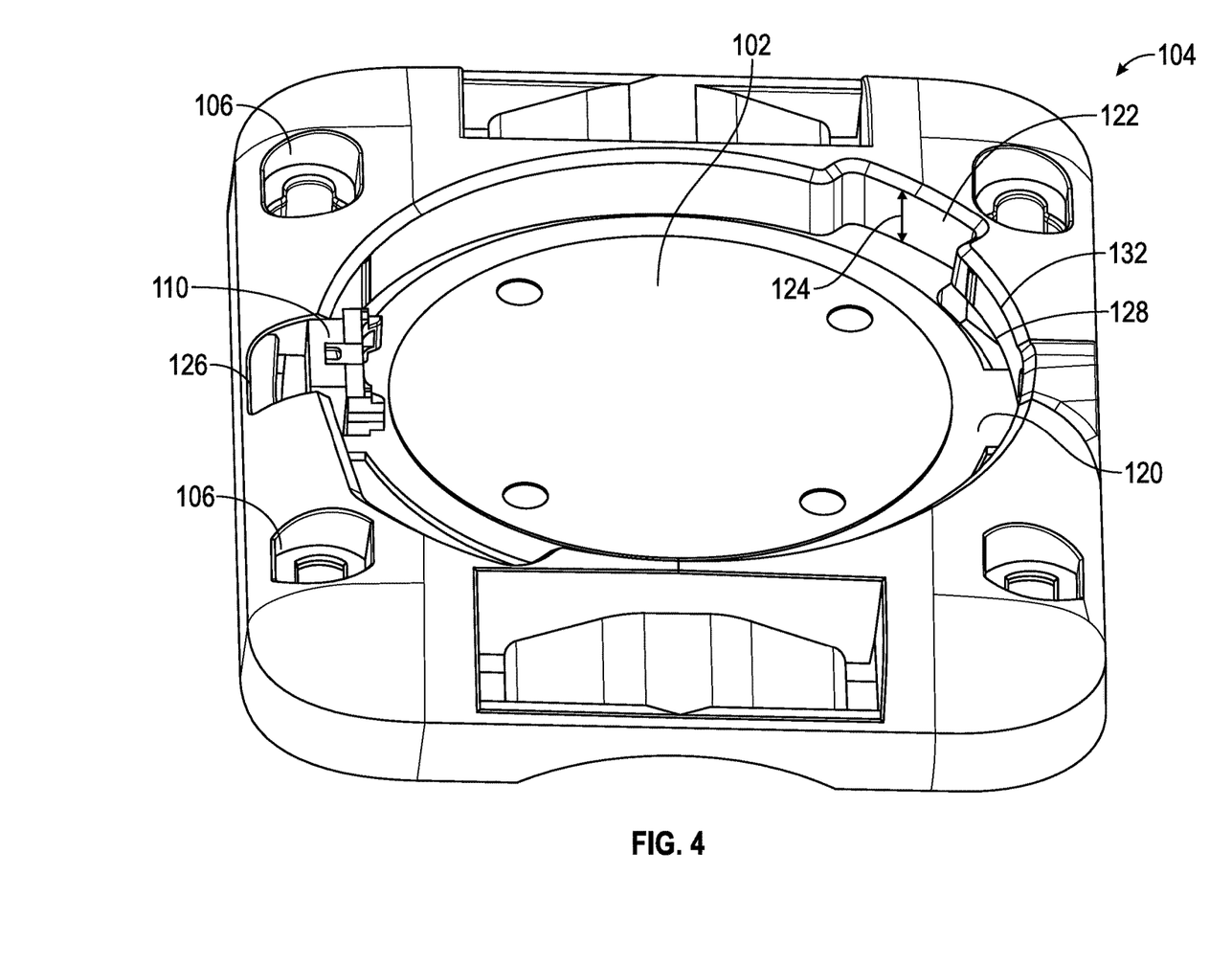
FIG. 4 illustrates a side isometric view of an example embodiment of a base of a mounting assembly.

FIG. 4 details a side elevational view of a base having a portion of a mounting plate received therein according to the present disclosure. The distal end 116 of the mounting plate 102 and the displaceable protrusion are shown received within the base 104, thereby detailing the mounting assembly 100 in a secured position. The base 104 can have at least one depression 126 formed in the perimeter edge 122. The at least one depression 126 can allow access through the perimeter edge 122 for a tool (not shown) to assist in decoupling the mounting plate 102 from the base 104. The at least one depression 126 allowing access through the perimeter edge 122 can allow compression of the biasing element 112 moving the protrusion 110 to the displaced position, thus allowing reverse rotation of the mounting plate 102 to decouple the mounting plate 102 from the base 104.

The biasing element 112 can have a sufficient biasing force to prevent a user from displacing the displaceable protrusion 110 from the undisplaced position to the displaced position without the use of a tool. The required use of a tool (not shown) can prevent unauthorized (i.e. theft) decoupling of the mounting plate 102 from the base 104. Unauthorized decoupling of the mounting plate 102 from the base 104 can allow removal of the equipment element 200, which may have significant monetary value. The tool can be utilized to overcome the biasing force provided by the biasing element 112 to displace the displaceable protrusion 110 to the displaced position, thereby allowing rotation of the mounting plate 102 relative to the base 104 for decoupling. Without use of the tool, the displaceable protrusion 110 received within the at least one depression 126 prevents decoupling rotation of the mounting plate 102 relative to the base, thereby securing the mounting assembly 100 and the equipment element 200.

As can be appreciated in FIG. 4, the at least one depression 126 is configured to receive the at least one protrusion 110. The at least one protrusion 110 being rotationally disposed within and engaged with the at least on depression 126 prevents rotational decoupling between the mounting plate 102 and the base 104 without displacement of the displaceable protrusion 110. The perimeter edge 122 impedes rotation of the mounting plate 102, thereby securing the mounting plate 102 within the base 104. The one or more tongues 120 can further secure the mounting plate 102 within the base 104 by being received within one or more groove 130 formed within the base 104 as shown more clearly in FIGS. 5 and 6.

Figure 5:
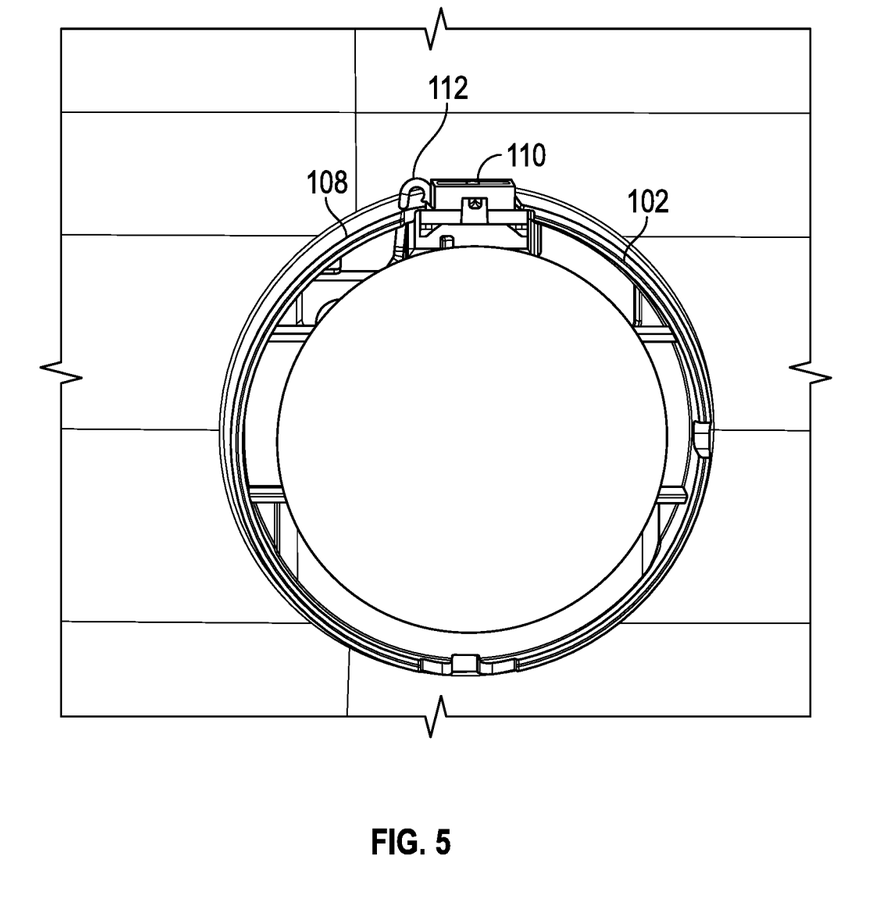
FIG. 5 illustrates a rear elevational view of an example embodiment of a mounting plate of a mounting assembly.

FIG. 5 details a mounting plate omitting the one or more tongues of a mounting assembly according to the present disclosure. As can be appreciated in FIG. 5, the mounting plate 102 omits the one or more tongues 120 for clarity to detail the one or more protrusions 110 extending beyond the perimeter edge 108 of the mounting plate 102. The biasing element 112 is also detailed by the omission of the one or more tongues 120 in FIG. 5. Rotation of the mounting plate 102 relative to the base 104 compresses the displaceable protrusion 110 against the one or more ridges 132 until aligning with the one or more depression 126, thus securing the mounting plate 102 to the base 104.

While FIG. 5 illustrates a single displaceable protrusion 110, it is within the scope of this disclosure to implement any number of displaceable protrusions 110 with the mounting plate 102. In at least one embodiment, the mounting plate 102 includes an equal number of displaceable protrusions 110 and tongues 120, for example one, two, three, or any other number of displaceable protrusions 110 and tongues 120.

Figure 6:
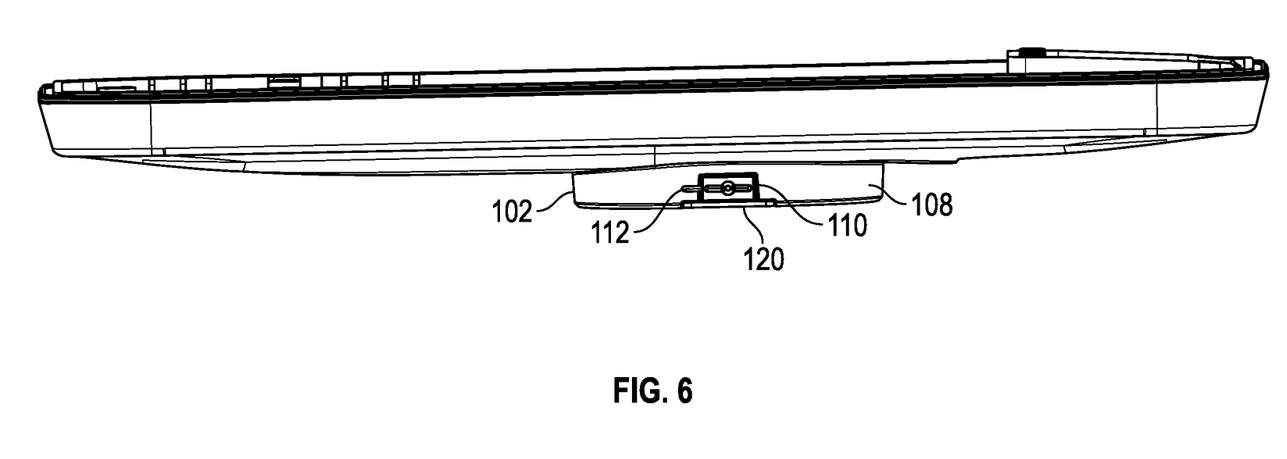
FIG. 6 illustrates a side elevational view of an example embodiment of a mounting plate of a mounting assembly.

FIG. 6 details a side elevational view of a mounting plate of a mounting assembly according to the present disclosure. As can be appreciated in FIG. 6, the one or more protrusion 110 can substantially align along the perimeter edge 108 with one of the one or more tongues 120 allowing the one or more protrusions and the one or more tongues 120 to enter the perimeter edge 122 of the base 104 in a single groove entrance 130.

Figure 7:
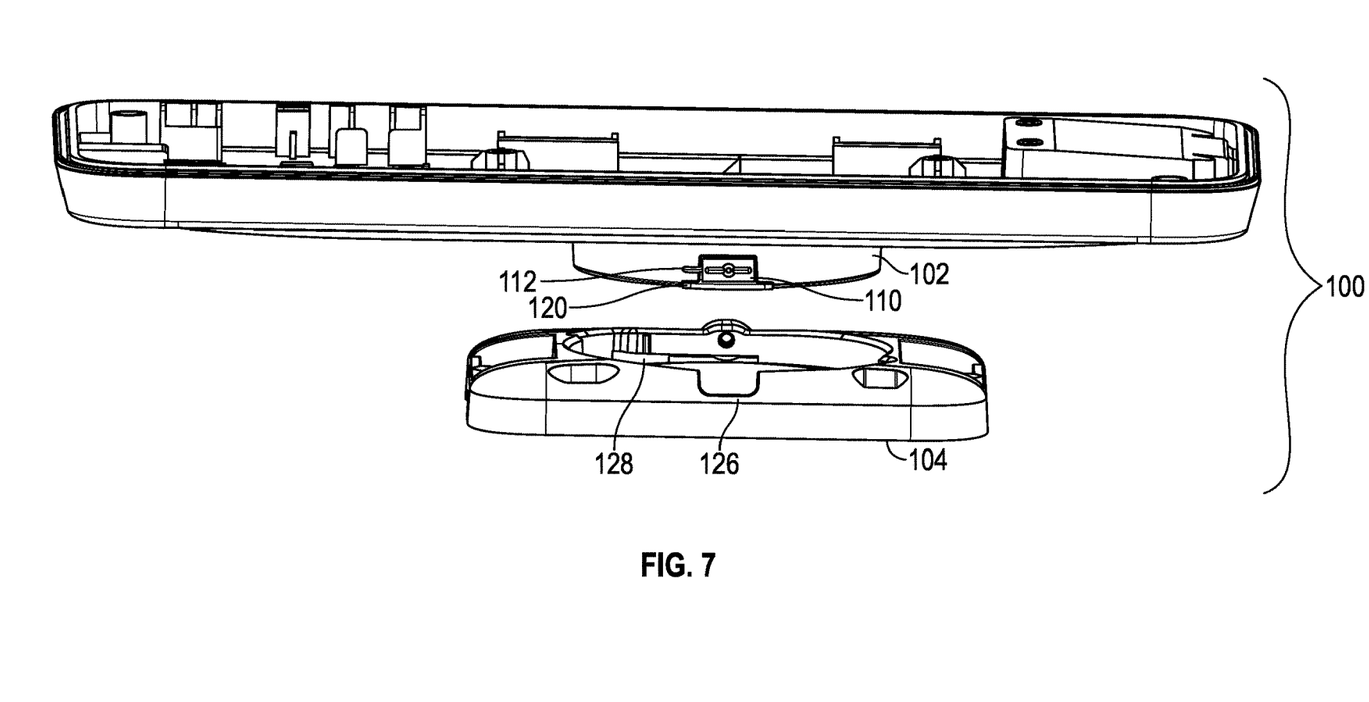
FIG. 7 illustrates an exploded isometric view of an example embodiment of a mounting assembly.

FIG. 7 details an exploded view of a mounting assembly in a secured position. The mounting plate 102 and the base 104 are rotationally secured one to the other, preventing removal of any potential equipment element 200 to which the mounting plate 102 is coupled. As can be appreciated in FIG. 7, in the secured position the at least one protrusion 110 substantially aligns with the at least one depression 126. The biasing element 112 coupled with the at least one protrusion 110 secures the at least one protrusions within the at least one depression and preventing undesirable rotation of the mounting plate 102 relative to the base 104. The at least one depression 126 provides access to compress the biasing element 112 and displace the at least one protrusion 110, thereby allowing decoupling rotation of the mounting plate 102 relative to the base 104.

As illustrated in FIG. 7, the mounting plate 102 is rotated clockwise relative to the base 104 (relative to a top down orientation) to transition from an unsecured position to the secured position. The mounting plate 102 can be rotated in a counter clockwise direction (relative to a top down orientation) to transition the mounting assembly 100 from the secured position to the unsecured position.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Also, the terms "about", "substantially", and "approximately", as used herein with respect to a stated value or a property, are intend to indicate being within 20% of the stated value or property, unless otherwise specified above. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A mounting apparatus for a wireless access point, the mounting apparatus comprising:
    a base having a perimeter edge, the perimeter edge having at least one depression formed therein;
    a mounting plate detachably couplable with the base, the mounting plate having a corresponding perimeter edge with at least one displaceable protrusion formed thereon, the at least one displaceable protrusion having a biasing element biasing the displaceable protrusion away from the corresponding perimeter;
    at least one tongue formed on the corresponding perimeter edge of the mounting plate and at least one groove formed on the perimeter edge of the base, the at least one groove configured to rotationally receive and engage with the at least one tongue,
    wherein at least a portion of the base perimeter edge is configured to compress the biasing element during rotation of the mounting plate relative to the base, thereby displacing the displaceable protrusion, and wherein the displaceable protrusion is configured to engage the at least one depression,
    wherein the at least one depression has an aperture disposed on a bottom surface, the aperture sized to receive a biasing element compression tool.

2. The mounting apparatus of claim 1, wherein, the corresponding perimeter edge of the mounting plate is an inner surface engagable with an outer surface perimeter edge of the base.

3. The mounting apparatus of claim 1, wherein, the corresponding perimeter edge of the mounting plate is an outer surface engagable with an inner surface perimeter edge of the base.

4. The mounting apparatus of claim 1, wherein at least fifty percent of the at least one tongue is received within the at least one groove.

5. The mounting apparatus of claim 1, wherein the base perimeter edge has at least one ridge formed therein, the at least one ridge configured to compress the biasing element of the at least one displaceable protrusion.

6. The mounting apparatus of claim 1, wherein the mounting plate is rotatationally engaged with the base, the mounting plate rotatable relative to the base until the at least one displaceable protrusion aligns with the at least one depression, wherein the biasing element compresses during rotation and expands upon alignment between the at least one protrusion and the at least one depression.

7. The mounting plate of claim 6, wherein the corresponding perimeter is an inner surface and disposed over the perimeter edge, the perimeter edge being an outer surface of the base.

8. The mounting plate of claim 6, wherein the perimeter is an inner surface and disposed over the perimeter edge, the corresponding perimeter edge being an outer surface of the mounting plate.

9. A mounting apparatus comprising:
a base having a perimeter edge, the perimeter edge having at least one depression formed therein, the perimeter edge having at least one groove formed therein;
a mounting plate rotationally engageable with the base, the mounting plate having a corresponding perimeter edge with at least one displaceable protrusion formed thereon, the at least one displaceable protrusion having a biasing element biasing the displaceable protrusion away from the corresponding perimeter edge, the corresponding perimeter edge having at least one groove formed therein,
wherein the mounting plate is rotatable relative to the base until the at least one protrusion aligns with the at least one depression, wherein at least a portion of the base perimeter edge is configured to compress the biasing element during rotation, the biasing element expanding upon alignment between the at least one protrusion and the at least one depression, thereby engaging the at least one protrusion with the at least one depression,
wherein the at least one depression has an aperture disposed on a bottom surface, the aperture sized to receive a biasing element compression tool.

10. The mounting apparatus of claim 9, wherein the base perimeter edge has at least one ridge formed therein, the at least one ridge configured to compress the biasing element of the at least one displaceable protrusion.

11. The mounting apparatus of claim 10, wherein the at least one ridge is formed in the base perimeter edge adjacent to the at least one depression.

12. The mounting apparatus of claim 9, wherein the corresponding perimeter is an inner surface and disposed over the perimeter edge, the perimeter edge being an outer surface of the base.

13. The mounting apparatus of claim 9, wherein the perimeter is an inner surface and disposed over the perimeter edge, the corresponding perimeter edge being an outer surface of the mounting plate.

14. The mounting apparatus of claim 9, wherein the perimeter edge has two depressions formed therein and evenly distributed around the perimeter edge, and wherein the corresponding perimeter edge has two displaceable protrusions formed thereon and evenly distributed around the corresponding perimeter edge.

15. A mounting apparatus comprising:
a base having a perimeter edge, the perimeter edge having at least one of a depression or at least one displaceable protrusion formed therein;
a mounting plate detachably couplable with the base, the mounting plate having a corresponding perimeter edge with the other of at least one depression or at least one displaceable protrusion;
a biasing element biasing the displaceable protrusion to an extended position;
wherein at least a portion of one of the perimeter edge or the corresponding perimeter edge is configured to compress the biasing element during rotation of the mounting plate relative to the base, thereby displacing the displaceable protrusion, and wherein the displaceable protrusion is configured to engage the at least one depression,
wherein the at least one depression has an aperture disposed on a bottom surface, the aperture sized to receive a biasing element compression tool.

16. The mounting apparatus of claim 15, wherein the base perimeter edge has at least one ridge formed therein, the at least one ridge configured to compress the biasing element of the at least one displaceable protrusion.

17. The mounting apparatus of claim 16, wherein the at least one ridge is formed in the base perimeter edge adjacent to the at least one depression.

18. The mounting apparatus of claim 15, wherein the perimeter edge has at least two depressions formed therein or at least two displaceable protrusions formed thereon and evenly distributed around the perimeter edge, and wherein the corresponding perimeter edge has at least two depressions formed therein or at least two displaceable protrusions formed thereon and evenly distributed around the corresponding perimeter edge.

* * * * *